(12) United States Patent
Brown

(10) Patent No.: US 6,752,470 B1
(45) Date of Patent: Jun. 22, 2004

(54) QUICK CHAINS TRACTION DEVICE FOR LIGHT AND HEAVY DUTY TRUCKS

(76) Inventor: Lae Luther Brown, 74 Chinkapin South, Pangburn, AR (US) 72121-0160

( * ) Notice: Subject to any disclaimer, the term of this patent is extended or adjusted under 35 U.S.C. 154(b) by 0 days.

(21) Appl. No.: 10/315,289

(22) Filed: Dec. 9, 2002

(51) Int. Cl.[7] .......................... B60B 15/00; B60B 39/00; B60C 11/00; B60C 27/00
(52) U.S. Cl. .......................... 301/42; 152/231; 152/233
(58) Field of Search ...................... 152/208, 231–232, 152/236–237, 233; 301/41.1, 42

(56) References Cited

U.S. PATENT DOCUMENTS

| | | | |
|---|---|---|---|
| 1,325,245 A | * | 12/1919 | Hodges ....................... 152/237 |
| 2,433,567 A | * | 12/1947 | Lofgren et al. ............. 152/233 |
| 6,009,922 A | * | 1/2000 | Gogan ........................ 152/218 |
| 6,581,661 B1 | * | 6/2003 | Morrison et al. ........... 152/232 |

* cited by examiner

*Primary Examiner*—S. Joseph Morano
*Assistant Examiner*—Jason R. Bellinger
(74) *Attorney, Agent, or Firm*—Michael I. Kroll

(57) ABSTRACT

The present invention 10 discloses a tire 12 traction device having two 30-ink sections 14L, 14R joined at one distal end by an additional link 16 having an S-hook 18 and two more chain links 20 connected thereto. A threaded quick link locking device 26 couples both 30 link section 14L, 14R together. When the device 10 is installed on a truck tire 12, all distal ends 20, 28L, 28R are coupled to the quick link device 26, securing the chain traction system 10 to the tire 12. The present invention 10 provides an anti-skid device comprising a chain positioned over the tread of a truck tire 12 and fastened through an opening 30L, 30R in the wheel 32 and having a threaded closed locking member 26 for engaging ends of the traction member.

2 Claims, 6 Drawing Sheets

QUICK CHAINS TRACTION DEVICE FOR LIGHT AND HEAVY DUTY TRUCKS

BACKGROUND OF THE INVENTION

1. Field of the Invention

The present invention relates generally to traction devices and, more specifically, to a traction chain link system for truck tires. The traction system of the present invention is an easy to install device that can assist in traveling through snow and ice covered roads and parking lots. It is also excellent for gaining traction when maneuvering under dropped trailers or getting away from loading docks when the truck has an empty load and there is no weight on the drive tires. The device of the present invention consists of two 30 link sections joined at one distal end by an additional link having an S-hook and two more chain links connected thereto. A threaded quick link locking device couples both 30 link sections together. When the device is installed on a truck tire, all distal ends are coupled to the quick link device, securing the chain traction system to the tire.

The present invention provides an anti-skid device comprising of a folded chain positioned over the tread of a truck tire and fastened through an opening in the wheel and having a threaded closed locking member for engaging the folded end with the distal ends of the traction member.

2. Description of the Prior Art

There are other traction devices designed for tires. Typical of these is U.S. Pat. No. 1,179,733 issued to McKinnon on Apr. 18, 1916.

Another patent was issued to Schiatter on Nov. 13, 1917 as U.S. Pat. No. 1,246,132. Yet another U.S. Pat. No. RE 14,450 was issued to Wilt on Mar. 26, 1918 and still yet another was issued on Mar. 18, 1919 to White as U.S. Pat. No. 1,297,620.

Another patent was issued to Rogers on Jan. 20, 1920 as U.S. Pat. No. 1,328,298. Yet another U.S. Pat. No. 1,401,503 was issued to Smith on Dec. 27, 1921. Another was issued to Harris et al. on Jan. 10, 1926 as U.S. Pat. No. 1,655,727 and still yet another was issued on Nov. 5, 1929 to Kittelson as U.S. Pat. No. 1,734,383.

Another patent was issued to Stokke et al. on Mar. 26, 1935 as U.S. Pat. No. 1,995,758. Yet another U.S. Pat. No. 2,006,659 was issued to Stuller on Jul. 2, 1935. Another was issued to Rookasin on Jan. 18, 1983 as U.S. Pat. No. 4,368,769 and still yet another was issued on Nov. 7, 2000 to Hicks as U.S. Pat. No. 6,142,202.

while these anti-skid devices may be suitable for the purposes for which they were designed, they would not be as suitable for the purposes of the present invention, as hereinafter described.

SUMMARY OF THE PRESENT INVENTION

The device of the present invention discloses a tire traction device having two 30-link sections joined at one distal end by an additional link having an S-hook and two more chain links connected thereto. A threaded quick link locking device couples both link sections together. When the device is installed on a truck tire, all distal ends are coupled to the quick link device, securing the chain traction system to the tire. The present invention provides an anti-skid device comprising a chain positioned over the tread of a truck tire and fastened through an opening in the wheel and having a threaded closed locking member for engaging ends of the traction member.

A primary object of the present invention is to provide an anti-skid device for truck tires.

Another object of the present invention is to provide an anti-skid device that is easy to install.

Yet another object of the present invention is to provide an anti-skid device comprising two lengths of chain having securing means on each distal end.

Still yet another object of the present invention is to provide an anti-skid device having a threaded locking member securing all loose ends thereon.

Still yet another object of the present invention is to provide and anti-skid device that is fastened after inserting one end through the tire wheel well.

Additional objects of the present invention will appear as the description proceeds.

The present invention overcomes the shortcomings of the prior art by providing a traction device for truck tires comprising two 30 link sections joined at one distal end by an additional link having an S-hook and two more chain links connected thereto. A threaded quick link locking device couples both 30 link sections together. When the device is installed on a truck tire, all distal ends are coupled to the quick link device, securing the traction chain to the tire.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

DESCRIPTION OF THE DRAWINGS

In order that the invention may be more fully understood, it will now be described, by way of example, with reference to the accompanying drawings in which.

LIST OF REFERENCE NUMERALS

Figure 1:
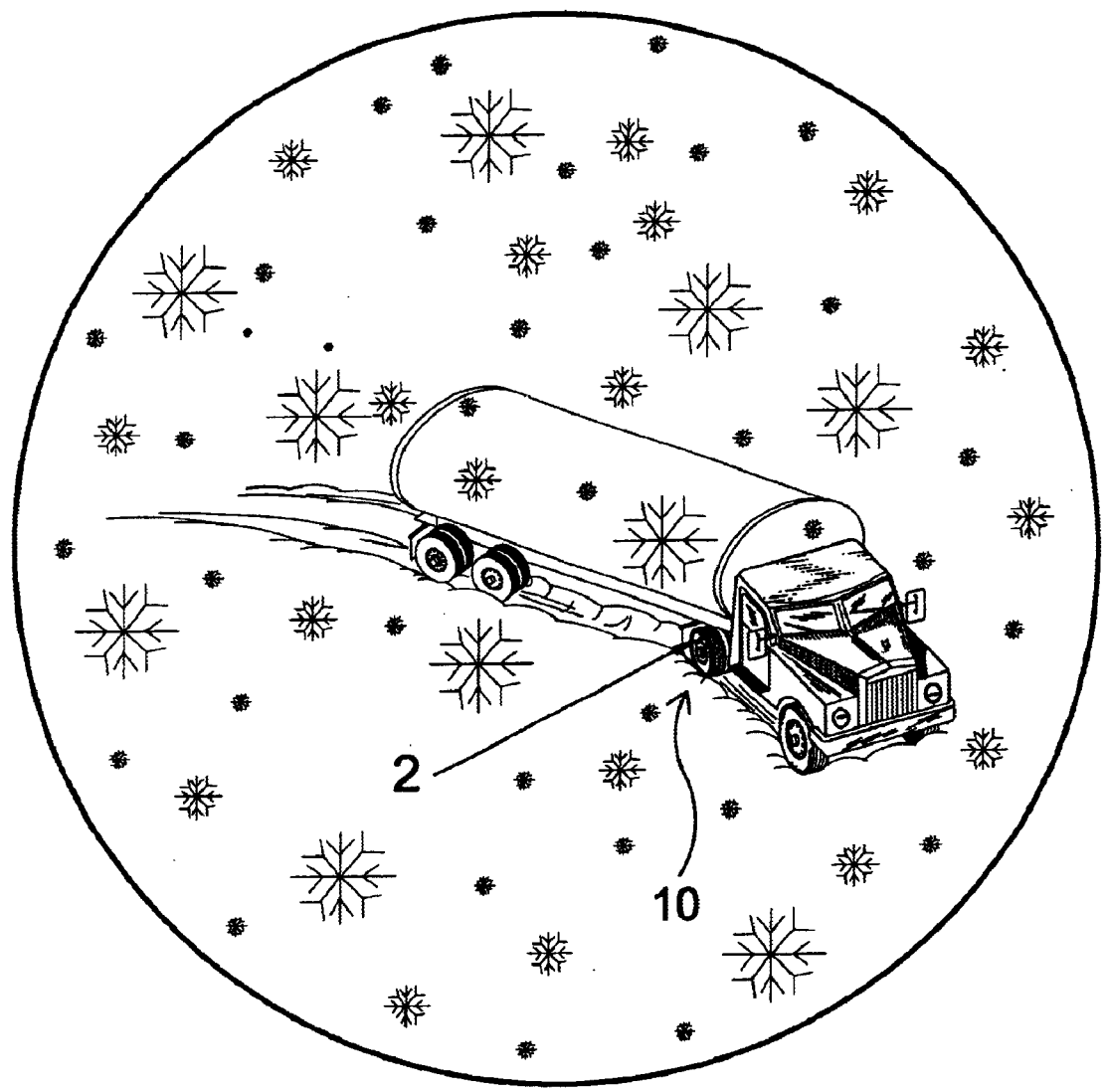
FIG. 1 is an illustrative view of the present invention in use.

With regard to reference numerals used, the following numbering is used throughout the drawings.
10 present invention
12 tire
14L 30 link chain
14R 30 link chain 16 additional link
18 S-hook
20 two additional links
26 quick link
28L end of 30 link chain
28R end of 30 link chain
30L tire wheel port
30R tire wheel port
32 wheel

DETAILED DESCRIPTION OF THE PREFERRED EMBODIMENT

The following discussion describes in detail one embodiment of the invention. This discussion should not be construed, however, as limiting the invention to those particular embodiments since practitioners skilled in the art will recognize numerous other embodiments as well. For a definition of the complete scope of the invention, the reader is directed to the appended claims.

FIG. 1 is an illustrative view of the present invention 10 in use. The present invention 10, a traction chain system for truck tires, is an easy to install device that can assist in traveling through snow and ice covered parking lots. It is also excellent for gaining traction when maneuvering under dropped trailers or getting away from loading docks when the truck has an empty load and there is no weight on the drive tires.

Figure 2:
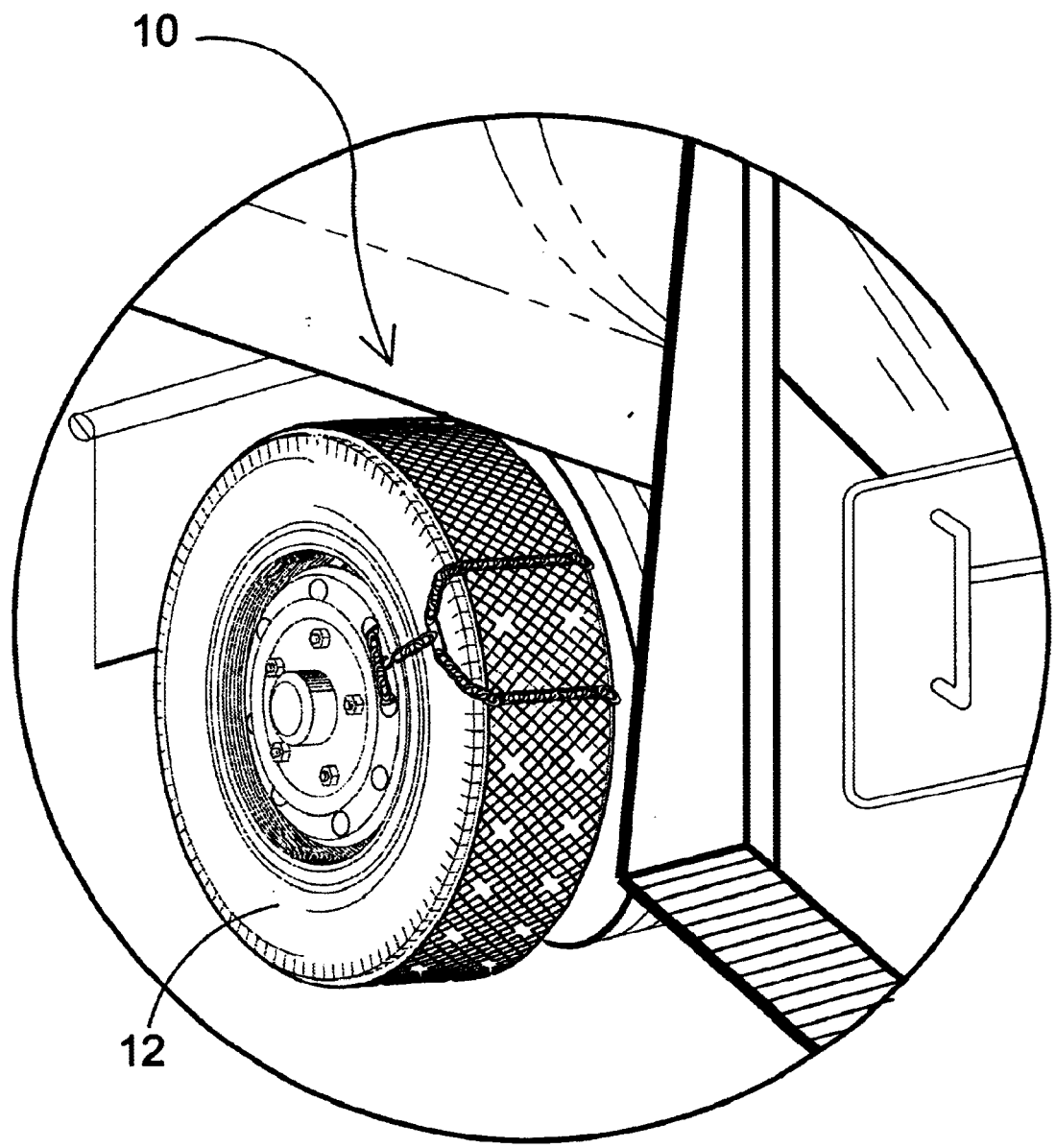
FIG. 2 is an illustrative view of the present invention in use.

FIG. 2 is an illustrative view of the present invention 10 in use. The present invention 10, a traction chain system for truck tires 12, consists of two 30 link sections joined at one distal end by an additional link, joined by an s-hook and two more chain links making a total of 63 chain links. At the other distal end, a quick link device couples both 30 link ends. When the device 10 is installed upon a truck tire 12, all distal ends are coupled to the quick link device, securing the chain traction system to the tire.

Figure 3:
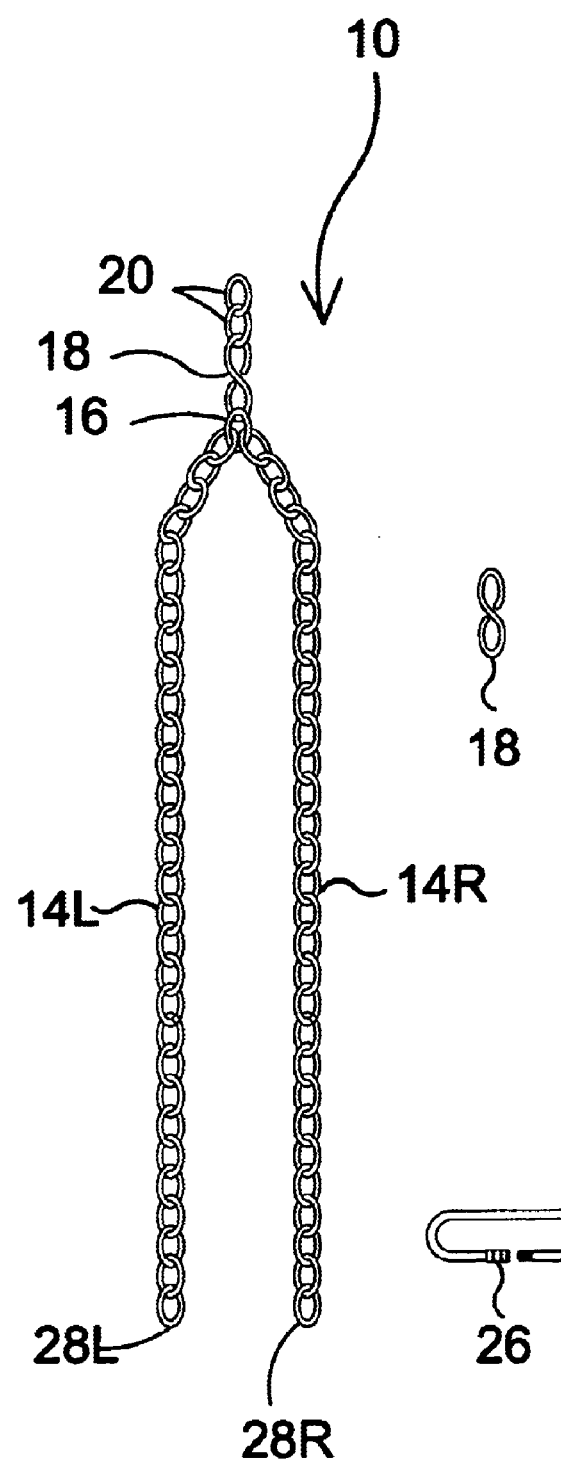
FIG. 3 is an orthographic view of the components of the present invention.

FIG. 3 is an orthographic view of the components of the present invention 10. The present invention 10 is a traction chain system for truck tires consisting of two 30 link sections 14L, 14R, an additional single link 16, S-hook 18, two top additional links 20, and a threaded quick link locking connector 26. Shown are two 30 link sections 14L, 14R which form the main chain portion joined at one distal end by an additional link 16, joined by an s-hook 18 and two more chain links 20 making a total of 63 chain links. At the other distal end, a quick link device 26 couples both 30 link ends 28L, 28R When the device 10 is installed upon a truck tire, all distal ends 20, 28L, 28R are coupled to the quick link device 26, securing the chain traction system to the tire.

Figure 4:
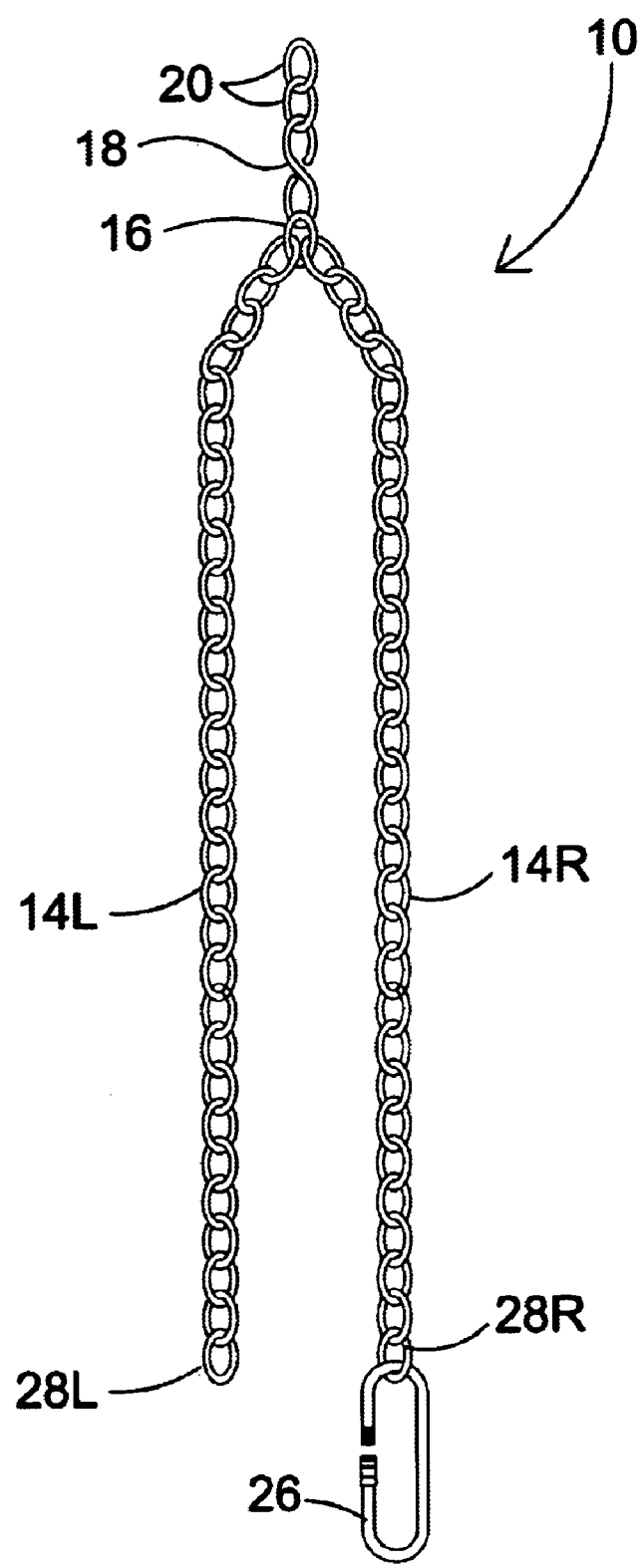
FIG. 4 is an orthographic view of the present invention.

FIG. 4 is an orthographic view of the present invention 10. Shown is a partially assembled view of the chain link member of the anti-skid traction device showing two length of chain 14L, 14R having a short length of chain 16, 18, 20 connected to one distal end and a threaded locking member 26 on the other distal end 28L, 28R. Once extended over the tire and inserted through an opening in the wheel well all three ends 20, 28L, 28R are inserted onto the quick link 26 which is a threadedly fastened closed link securing the traction device 10 to the tire.

Figure 5:
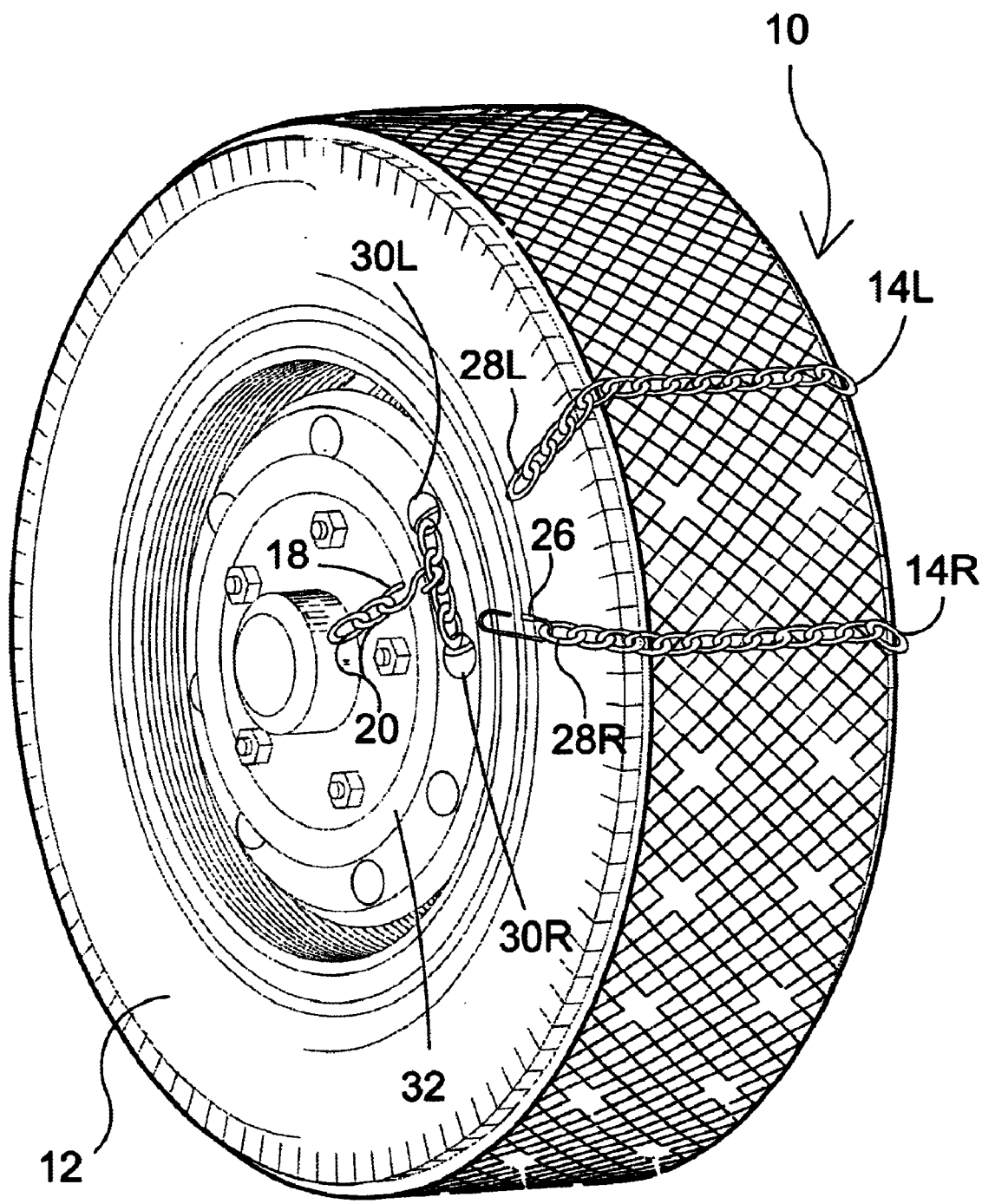
FIG. 5 is a perspective view of the present invention in use.

FIG. 5 is a perspective view of the present invention 10 in use. Shown is the present invention 10, a traction chain system, mounted on a truck tire 12. One end of each of the chains 14L, 14R passes through a horizontal tire rim port hole 30L, 30R as the other distal ends 28L, 28R are placed over the tire 12 and joined at the quick link 26. All distal ends 20, 28L, 28R are coupled together by means of a quick link connector 26, securing the chain traction system to the truck wheel 32. Also shown is S-hook 18.

Figure 6:
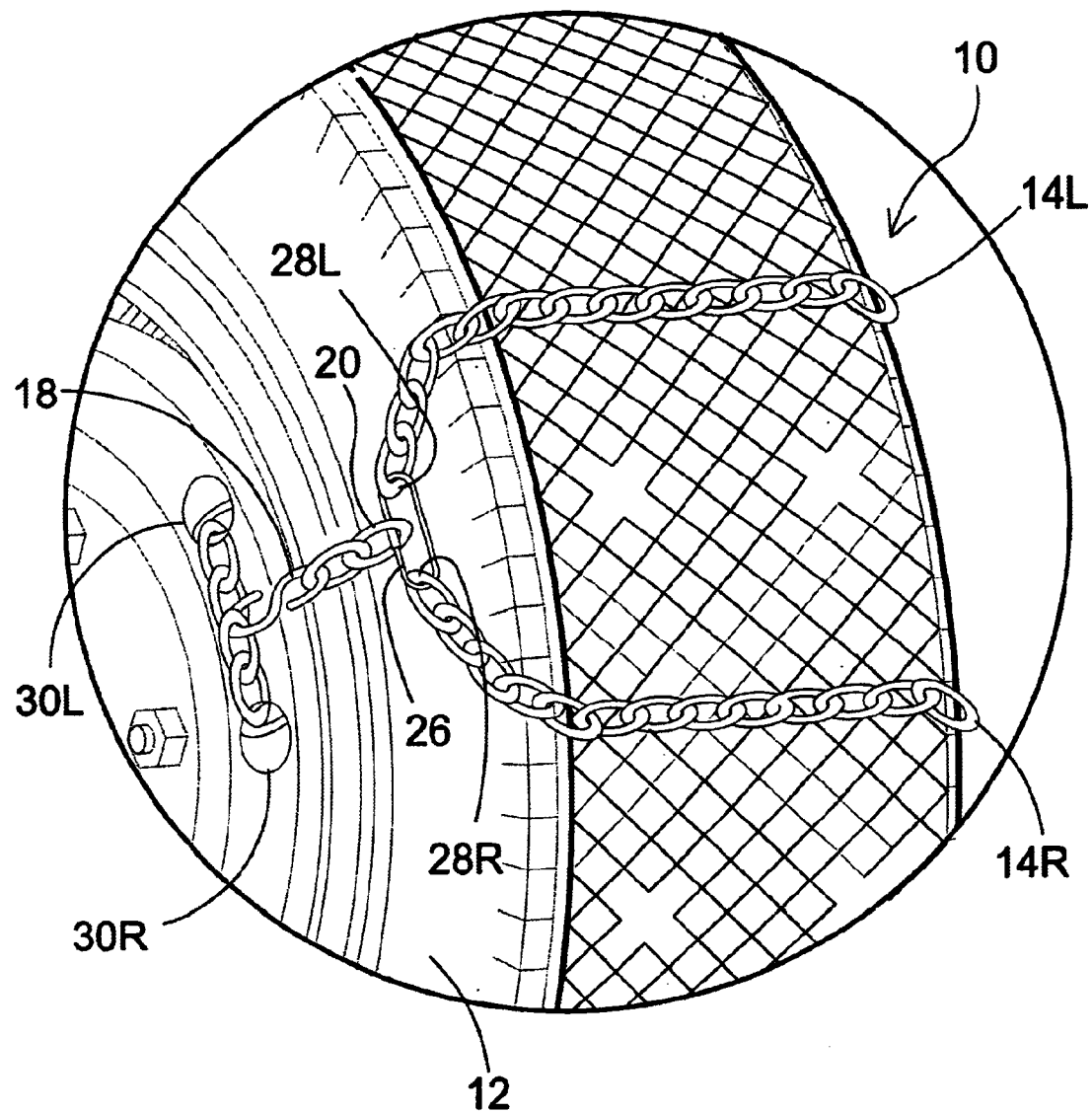
FIG. 6 is a detailed perspective view of the present invention in use.

FIG. 6 is a detailed perspective view of the present invention 10 in use. Shown is the present invention 10, traction chain system, mounted on a truck tire 12. One end of each of the chains 14L, 14R passes through a horizontal tire rim port hole 30L, 30R as the others distal ends 28L, 28R are placed over the tire 12 and joined at the quick link 26. All distal ends 20, 28L, 28R are coupled together by means of a quick link connector 26, securing the chain traction system to the truck tire 12. Also shown is S-hook 18.

I claim:

1. An apparatus for a traction chain for use on a vehicle tire, comprising:

a) a vehicle wheel, said wheel having a tire mounted on the rim thereof, said wheel having at least two holes therein, wherein said holes are horizontally disposed through said wheel, said wheel having a pair of sides;

b) a chain, wherein said chain comprises a pair of main chain links, said pair of main chain links each having a first end and a second end;

c) a first additional link, said first additional link being connected to said first end of said pair of main chain links so that each of said second ends of said pair of main chain link ends can each pass through a hole in the vehicle wheel and over the tire and then be connected to a quick-connect link;

d) an S-hook link disposed on said first additional link for connection to a second pair of additional links, said S-hook having a pair of ends wherein one end of said S-hook is connected to said first additional link and a second end is connected to said second pair of additional links;

e) said second pair of additional links disposed on said second end of said S-book link for connection to said quick-connect link so that the first link of said second pair of additional links is connected to said S-hook and the second link is connected to said quick-connect link; and, f) said quick-connect link for connection to said second link of said second pair of additional links and each of said second ends of said pair of main chain links to permit the chain to be secured about the vehicle tire and wheel.

2. The apparatus of claim 1, wherein said pair of main chain links each comprise thirty links.

* * * * *